United States Patent [19]
Wilson et al.

[11] Patent Number: 5,997,925
[45] Date of Patent: Dec. 7, 1999

[54] CONTINUOUS MANUFACTURING PROCESS AND APPARATUS FOR PREPARING PRE-COOKED BACON

[75] Inventors: Clark B. Wilson, Webb City, Mo.; Sharon K. Marsh, New Brighton, Minn.; Kevin J. Finnie, Green Bay, Wis.; Coralie G. Brooks, Petaluma, Calif.; Shawn L. Owens, Joplin, Mo.

[73] Assignee: Swift-Eckrich, Inc., Downers Grove, Ill.

[21] Appl. No.: 08/898,446

[22] Filed: Jul. 22, 1997

[51] Int. Cl.[6] .................................. A23B 4/00; A47J 37/12
[52] U.S. Cl. ...................... 426/332; 426/641; 426/518; 426/523; 99/443 C; 99/451; 99/386; 99/404
[58] Field of Search ................................ 426/264, 266, 426/641, 332, 513, 518, 520, 523; 99/352, 355, 385, 386, 403, 404, 443 R, 443 C, 451, 467, 473, 537

[56] References Cited

U.S. PATENT DOCUMENTS

| | | | |
|---|---|---|---|
| 2,974,047 | 3/1961 | Holmes et al. | 99/174 |
| 3,134,678 | 5/1964 | Wierbicki et al. | 99/159 |
| 3,878,307 | 4/1975 | Coleman et al. | 426/266 |
| 3,906,115 | 9/1975 | Jeppson | 426/243 |
| 3,961,568 | 6/1976 | Jeppson | 99/339 |
| 4,169,161 | 9/1979 | Leidy et al. | 426/89 |
| 4,379,794 | 4/1983 | Theiler | 426/266 |
| 4,411,922 | 10/1983 | Theiler | 426/266 |
| 4,414,232 | 11/1983 | Sleeth et al. | 426/266 |
| 4,435,433 | 3/1984 | Theiler | 426/266 |
| 4,532,858 | 8/1985 | Hershfeld | 99/534 |
| 4,917,911 | 4/1990 | Bush et al. | 426/243 |
| 4,940,590 | 7/1990 | Williams et al. | 426/92 |
| 4,957,756 | 9/1990 | Olander et al. | 426/243 |
| 5,090,939 | 2/1992 | Leblanc | 452/127 |
| 5,132,126 | 7/1992 | Sinkler et al. | 426/241 |
| 5,407,693 | 4/1995 | Brooks et al. | 426/523 |
| 5,567,460 | 10/1996 | Afman | 426/264 |

FOREIGN PATENT DOCUMENTS

| | | |
|---|---|---|
| 0 666 030 A1 | 8/1995 | European Pat. Off. . |
| 0 683 986 A1 | 11/1995 | European Pat. Off. . |
| 79036 B3 | 3/1998 | Ireland . |
| 79037 B3 | 3/1998 | Ireland . |
| 848014 | 9/1960 | United Kingdom . |
| 944278 | 12/1963 | United Kingdom . |
| WO 98/17121 | 10/1997 | WIPO . |

*Primary Examiner*—David Lacey
*Assistant Examiner*—Drew Becker
*Attorney, Agent, or Firm*—Pretty, Schroeder & Poplawski

[57] ABSTRACT

A continuous manufacturing process for preparing cooked bacon includes the step of cooking slices of an uncured and unsmoked pork belly with cure ingredients applied on the slices to produce cooked bacon having the organoleptic properties of cooked conventionally cured and smoked bacon. An apparatus for continuously preparing cooked bacon includes a slicing device, a continuous cure ingredient application station and a continuous cooking station.

42 Claims, 1 Drawing Sheet

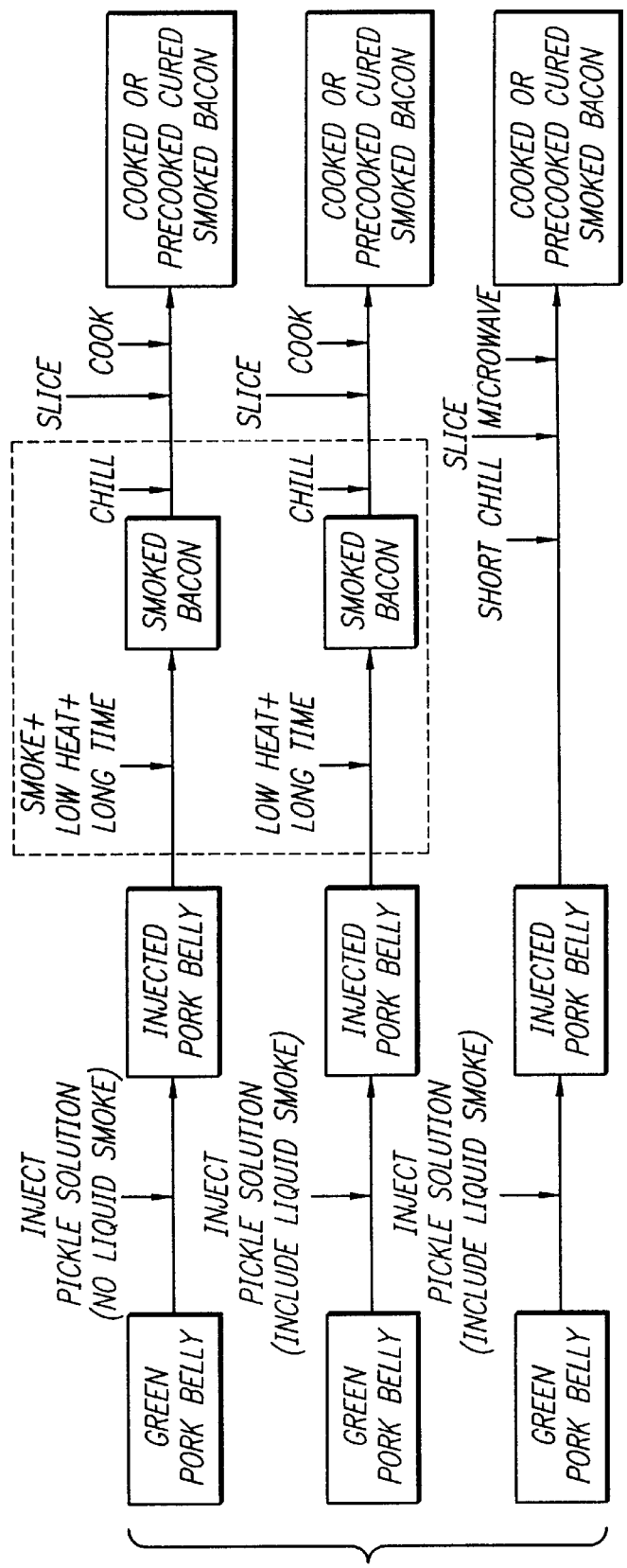
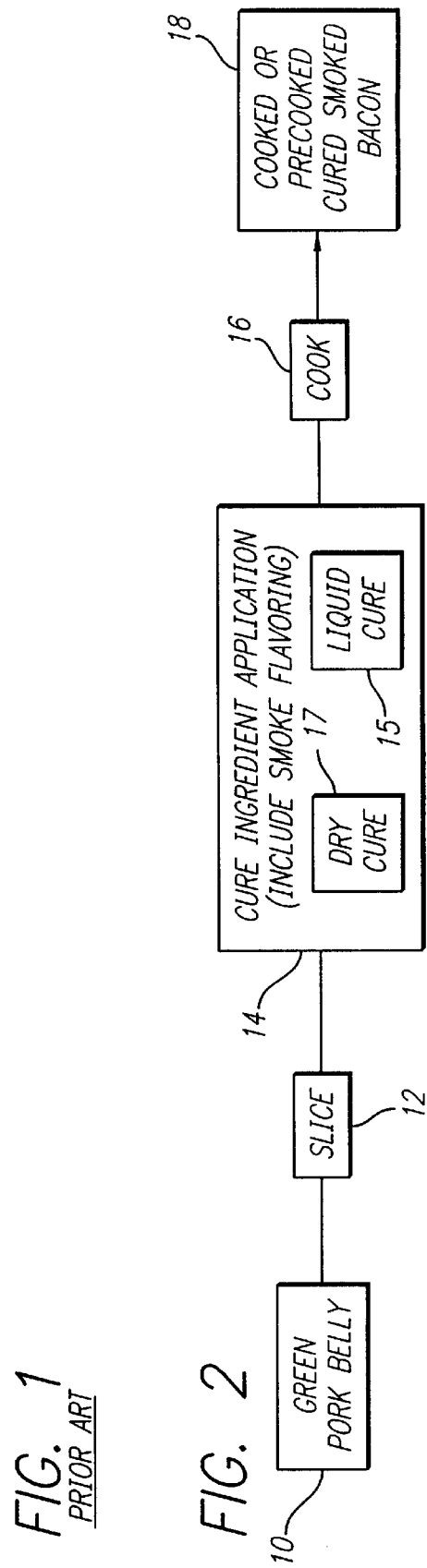
FIG. 1 PRIOR ART
FIG. 2

CONTINUOUS MANUFACTURING PROCESS AND APPARATUS FOR PREPARING PRE-COOKED BACON

BACKGROUND OF THE INVENTION

This invention relates to a method for preparing cooked or pre-cooked bacon, and more particularly to a method for preparing cooked or pre-cooked bacon in a continuous manufacturing process without a traditional curing and smokehouse process.

Traditional curing is accomplished by injecting salt, either alone on in combination with sodium or potassium nitrite, to the green (uncured and unsmoked) pork belly and allowing it to disperse throughout the meat and allowing the meat to mature in the presence of the curing ingredients. The curing ingredients are commonly incorporated into a brine solution (hereinafter referred to as the "pickle solution" or "cure solution") and pumped directly into the green pork belly under pressure to increase the weight of the meat by about 8% to 15% of its green weight. Pumping the pork belly with cure solution helps the curing ingredients disperse in the meat more rapidly. Alternatively, the cure ingredients can be added as a dry rub to the pork belly or immersing the pork belly in a cure solution.

The cure solution performs several different functions during the curing process and after to provide certain characteristics to the pork belly. Salt acts by dehydration and altering osmotic pressure to inhibit growth of spoilage bacteria. Nitrite retards development of rancidity and produces the characteristic cured meat flavor. It also reacts with the meat pigments to stabilize the color, and most importantly inhibits the growth of Clostridium botulinum and other spoilage microorganisms. The level of nitrite allowed in curing is limited by regulation since nitrite may react with the natural amines of the meat and produce carcinogenic N-nitrosamines. Polyphosphates are also used to buffer the acidity of the liquid cure solution and also to increase the water-binding capacity in cured meats. Sugar and spices are added for flavoring. Traditionally, curing is generally considered to be complete when the curing ingredients in the pickle solution have diffused throughout the meat, and the meat has matured, that is, the color of the cured meat is fixed to a dark pink color and a portion of the water is bound. This typically takes place during smoking.

Smoking of a whole pork belly is carried out for development of a smoky flavor, additional preservation, development of color, and protection from oxidation. The term "smoking" is defined herein as a process of applying smoke to a pork belly at low heat conditions for a long period of time. The time period must be sufficient to bring the weight below about 103% of the green weight and at a temperature that does not render fat of the pork belly. Although smoke has traditionally been generated by smoldering wood or sawdust, liquid smoke is now most commonly used. Liquid smoke is prepared by destructive distillation of wood. The particle phase is removed by washing with water, and leaving the vapor phase in solution. Liquid smoke is applied by spraying, dipping, or atomizing with heat. Liquid smoke is preferred because it can be applied more uniformly. In addition, the use of liquid smoke avoids the necessity of having to clean equipment, and also avoids the health hazards of environmental pollution from smoke vapor.

Smoke (vapor or liquid) contains chemicals, principally aldehydes, phenols, ketones, and acetic acid. These chemicals are instrumental in killing yeast, mold and bacteria, and in retarding future growth. The smoke is deposited on the surface of the meat where it then penetrates the food and distributes the preservative and flavoring elements. Alternatively, the smoke may be injected directly into the meat as an ingredient of the cure solution, thus accelerating the dispersion of the chemicals contained in the smoke.

Low heat conditions for relatively long periods of time are also considered to be essential for proper traditional smoking and curing of a pork belly. Typically, smoking and curing involves placing the injected pork bellies in heated, smoke-laden currents of air in a smokehouse. Where liquid smoke is used in the pickle solution, traditional smoking and curing still requires that the injected pork bellies be heated in a smokehouse at temperatures and for time periods equivalent to those in a smokehouse with smoke vapor. Proper smokehouse temperatures for bacon do not render fat, yet are sufficiently high that moisture is drawn off rapidly. Generally, the temperature of a smokehouse for bacon is less than about 160° F. Typically, the internal temperature of the pork belly is between about 126° F. and about 128° F. The smoking step is complete when the moisture content has been stabilized at a level to provide a smoked, cured and chilled weight below about 103% of the green weight. This ordinarily requires minimum periods of time ranging from about 6 to about 8 hours, although smoking for much longer periods of time is not uncommon. The heat accelerates loss of moisture, thereby contributing to the curing of the meat. Curing decreases microbial growth, enzyme activity, and deteriorative reactions by removing available water in the product. Smoking and curing generally brings the water activity to less than that of a green belly, typically to between about 0.90 and about 0.95. A completely cured and smoked pork belly has a stable reddish color and is firm to the touch.

The resulting cured and smoked pork belly is then conventionally chilled and sold as slab bacon, or further processed and sold as sliced bacon. Chilling brings the temperature of the smoked pork belly down from about 128° F. to between about 15–35° F. Below 35° F., the bacon not only keeps well, but is also firm enough that it can be sliced in a slicing machine and packaged.

Alternatively, slices of the cured and smoked bacon can be partially or fully cooked after the slicing step, and then marketed as pre-cooked or cooked bacon. Bacon is cooked by rapidly applying sufficient energy to render fat. Bacon is generally considered to be pre-cooked when the yield of the bacon is about 36% to 45%. Bacon is considered cooked, or fully cooked, when the yield is about 26% to 36% of the raw product.

As can be readily appreciated, the traditional curing and smoking steps described above are expensive. Not only do these steps require long periods of time, but they also require costly equipment and consume large amounts of energy to maintain the elevated temperatures. These steps also require large facilities to store the inventory of the pork bellies at specific environmental conditions during both the curing and smoking steps.

While some food scientists have recently invented ways around the traditional smoking and curing steps, as disclosed in U.S. Pat. No. 4,957,756, the prior art has nevertheless considered the traditional step of dispersing the cure to be essential in the manufacture of bacon, especially pre-cooked bacon. The traditional smoking and curing process is even more time-consuming. Injecting pork bellies with cure solution and smoking in a smokehouse requires large storage facilities that require capital to maintain.

SUMMARY OF THE INVENTION

In accordance with one aspect of the present invention, bacon that is at least partially cooked is prepared without the conventional curing and smoking conditions for long time periods. In the method of this invention a green pork belly is first cut into slices. Then the slices are moved continuously along a processing direction while applying cure ingredients to the slices. Then while the slices are continuously moved in the processing direction they are cooked for a sufficient time such that the weight of the slices is no more than about 45% of their green weight.

In accordance with another aspect of this invention, an apparatus for continuously preparing at least partially cooked bacon is provided. The apparatus includes a pork belly slicing device, a cure ingredients application station that has a cure solution application unit and one or more continuous belts for moving pork belly slices from the slicing machine to and through the cure solution application unit. An optional dry cure ingredient application unit may be provided. A continuous cooking station that has a continuous cooking oven and one or more continuous belts moves the pork belly slices from the cure application station to and through the continuous cooking oven.

In accordance with yet another aspect of the method of this invention, a green pork belly that is less than about 40° F. is pressed and cut. The cut pork belly has cure solution applied to it, and is cured and cooked in one step. The pork belly is cut into slices and the slices are placed on a moving belt and subjected to the application of liquid cure solution. Additional dry cure ingredients may also be added. Then the slices are moved through an oven to cook the bacon slices. Significant savings are achieved by carrying out the curing and cooking steps in a continuous manufacturing process.

Other aspects and advantages of this invention will become apparent to those skilled in the art upon consideration of the following description of the preferred embodiments of the present invention.

BRIEF DESCRIPTION OF THE DRAWINGS

FIG. 1 is a schematic diagram of conventional prior art processes for making cooked or pre-cooked, cured smoked bacon.

FIG. 2 is a schematic diagram of a preferred embodiment of the process and apparatus for making cooked or pre-cooked, cured bacon according to the present invention.

DETAILED DESCRIPTION OF THE INVENTION

It has been discovered that cooked or pre-cooked bacon can be made without the low heat and long time periods associated with the conventional curing and smoking steps, yet the bacon surprisingly retains the distinctive organoleptic properties of conventionally cured and smoked bacon.

The essence of this invention can be understood more readily upon reference to the schematic diagrams of FIGS. 1 and 2. FIG. 1 shows three different prior art methods of making cooked bacon. As may be seen in the upper two processes of FIG. 1, the traditional curing, smoking and chilling steps are surrounded by the dotted line. As may be seen in the third process of FIG. 1, the science of preparing cooked or pre-cooked smoked bacon has advanced to the point of eliminating this traditional smoking step. This third process is the subject of U.S. Pat. No. 4,957,756, the full disclosure of which is incorporated herein by reference.

FIG. 2 shows a schematic diagram of the steps in one embodiment of the method and apparatus of the present invention. In this embodiment, the traditional curing and smoking steps according to methods known to and practiced by those skilled in the art is eliminated. The conventional curing and smoking steps, which traditionally requires that the bacon be smoked at low heat for a period of time sufficient to reduce the weight of the pork belly to about 103% of its green weight without rendering fat, is eliminated. The post-curing and post-smoking chilling step may also be eliminated.

Referring to FIG. 2, this invention is for the continuous manufacture of pre-cooked or cooked bacon by first providing a green uncured pork belly 10. The method eliminates the step of traditional curing of whole green pork bellies and, instead, first slices the uncured green pork belly at a slicing station 12. Next, the method applies cure ingredients to the slices in a continuous manner through a cure ingredient application station 14. The cure ingredients may be applied to the slices through their immersion in a cure solution that includes liquid smoke, or by passing through a spray of a cure solution by liquid cure application unit 15 or dry cure powder by powder application unit 17 for sufficient time to accomplish consistent application. It will be recognized that any suitable combination of these methods may also be used to apply the cure ingredients. Then, immediately, or shortly thereafter, (that is, without the need for any intervening processing and preferably before the slices can mature) the slices are cured and cooked concurrently in a continuous cooking type device at a cooking station 16. Thus, the curing of the slices is accomplished while the slices are cooking. The cooking may be accomplished in any suitable continuous cooking device 16, such as a microwave oven, belt grill oven, or an impingement convection oven, to obtain a pre-cooked or cooked bacon. The pre-cooked or cooked bacon product has the organoleptic properties, that is, the taste, smell, appearance and low water activity of a cooked, cured and smoked bacon. At least, the cure ingredient application, curing and cooking are done in a continuous manufacturing process (with the curing and cooking performed concurrently) whereby the pork belly moves continuously through these steps as explained in greater detail below.

The method generally described above also eliminates the need for a post-smoking chilling step, thus significantly reducing the amount of energy required to bring or maintain the pork belly at the appropriate temperature for slicing. In the first two conventional processes shown in FIG. 1, it is necessary that the smoking step bring the internal temperature of the pork belly up to about 128° F. The subsequent chilling step must therefore bring the temperature of the smoked pork belly back down to between about 15° F. to 25° F., a temperature difference of about 100° F. Still, when the smoking step is eliminated, as shown in the third process of FIG. 1, the chilling step immediately follows the pickle dispersion, and the temperature need only be brought from a temperature of about 50° F. back down to about 25° F., a temperature difference of only 25° F. (compared to the 100° F. difference of the conventional method). About 32–48 hours are required to complete this partial chilling from 50° F. to 25° F. However, even this partial chilling may be eliminated by this invention because green pork bellies are typically shipped and stored cold enough to slice.

This invention is in contrast to the conventional method where the manufacturing process is done not continuously, but batch-wise by injecting cure solution into whole green pork bellies followed by curing in a smokehouse and then cooling and slicing the cured pork bellies. Thus, in this invention, the traditional curing step, which has traditionally been considered an essential step in the production of bacon, is eliminated. The result is cooked or pre-cooked bacon having the organoleptic properties of cooked or pre-cooked cured, smoked bacon, but which has not been cured and smoked using traditional methods, and therefore, can be manufactured in a fraction of the time for a fraction of the cost.

With this overview of the invention in mind, the details of the method of this invention may be more readily described. Typically, frozen or chilled pork bellies are first received from a supplier. The bellies are then cut to desired size and tempered or thawed to a temperature of about 35° F. Alternatively, green pork bellies may be received cold at about 20–30° F. and held at that temperature prior to processing. Bellies may be pressed or shaped into a uniform shape or size on a bacon press such as that made by Ross Industries, Midland, Va. Uniform size is desirable so that the bellies have the proper dimensions for slicing and packaging. It is also desirable from a standpoint of consumer appeal to have bacon slices of uniform size. If necessary, the bacon bellies may also be trimmed to roughly the desired size prior to or after the shaping step. The bellies may also be pressed into non-traditional shapes, such as rolls, so that round slices may be produced. If necessary, the bellies may be chilled, for example, in a Nitrogen or $CO_2$ tunnel. One such tunnel is manufactured by Airco Cryogenics of Murray Hill, N.J. This chilling step further inhibits undesirable bacterial growth, and provides proper stiffness for slicing.

The bellies are now ready to be sliced at a slicing station 12. It is desirable to slice the bellies directly onto a continuously moving conveyor. A slicer manufactured by J.E. Grote Co., Blacklick, Ohio, and having model number HS-640-IC has been found to be especially suitable. Bellies are loaded vertically from the top, and sliced such that individual slices are placed directly onto the continuous conveyor belt. The slices may be sliced to a thickness of between about 0.6 mm to 6.4 mm. Preferably, the slices are about 2.1 mm.

Following slicing, the slices are placed on one or more continuous moving belts to move the slices in a processing direction to the cure application unit or station 14 and then to a cooking unit or station 16. For the cure application unit 14, cure solution, which has been previously made-up and held in a refrigerated tank at 40° F. or less is applied to the slices. The cure solution may be similar to that used to inject bellies in the conventional process. A detailed description of pickle or cure solutions used in other processes is disclosed in U.S. Pat. No. 4,957,756, the full disclosure of which is incorporated herein by reference. A suitable composition that may be used in this invention is shown below:

| Component | Percentage |
| --- | --- |
| Salt | 11.6 |
| Sugar | 7.0 |
| Liquid Smoke | 8.5 |
| Sodium Tripolyphosphate | 0.36 |
| Sodium Nitrite | 0.086 |
| Sodium Erythrobate | 0.392 |
| Water | 72.06 |
| TOTAL | 100.00 |

The ranges on the cure solution, can be varied generally within the following ranges:
water, from about 60% to about 80%;
salt, from about 10% to about 25%;
sugar, or brown sugar, from about 2% to about 10%;
liquid smoke, from about 0% to about 15%;
sodium erythrobate, from about 0.05% to about 0.4%;
sodium nitrite, from about 0.01% to about 0.15%; and
sodium phosphate, from about 0% to about 0.5%, The lower range on the water is about the minimum amount needed to dissolve the cure ingredients, while the maximum is selected to avoid unnecessary energy consumption during the microwave oven cooking or precooking step. Sodium phosphate may be added in an amount between 0–0.5% and regulated to buffer the acidity in the cure solution and the desired water-binding capacity of the pork belly. The amount of salt varies according to taste. The lower range of both sugar ingredients is selected to assure sufficient browning without the smoking step, and the maximum is based on the amount needed to maintain a correct flavor profile.

Finally, the amount of sodium erythrobate is determined by the amount needed to stabilize the nitrite and to meet USDA regulations.

In the present invention, the cure solution may be applied by any suitable method. In the preferred embodiment, the cure solution is applied as a liquid cure at liquid cure unit 15 by one of two methods. By either liquid cure application method, the amount of cure pick-up is variable, but normally the target is in the range of 6–20% depending on such things as desired slice thickness. A first method is by spraying cure solution from dual spray heads that are positioned directly after the slicer so that both sides of the pork belly slice receive a consistent application of the pickle ingredients as the slice moves past the spray heads on an open mesh continuous belt. In this embodiment, cure solution is pumped by a pump from a cure tank. The slices, with cure ingredients applied, move across a continuous belt which feeds the cooking unit or station 16.

Alternatively, the liquid cure may be applied to slices by having them immersed directly in a cure tank at the pickle application station 14. In this embodiment, the slices are sandwiched between two continuously moving hold-down belts, or screens, which convey the slices through the immersion pickle tank for sufficient time, usually for 2 minutes or less, to apply cure solution to the green pork belly slices. For example, a typical hold-down belt and immersion tank arrangement is disclosed in U.S. Pat. No. 5,132,126, the full disclosure of which is incorporated herein by reference. After coming out of the cure tank, the slices are then transferred from the dual hold-down belts and onto the belt that moves to the cooking unit 16. There is no need to let the slices stand before cooking to provide time for the pickle or liquid cure solution to disperse in the traditional sense. Immediately following application of cure solution to pork belly slices by either spraying or immersion, additional cure ingredients may be added in the form of dry powder by a dry cure application 17 to achieve such purpose as to intensify the salt, sweet or smoke flavor characteristics of cured and cooked bacon. A suitable powder applicator is available from Christy Machine Co., Freemont, Ohio, as Christy Sivoseasoner Model 39"—DI-S(SP).

The total time between applying the cure ingredients and completing the cooking is short compared to the amount of time allowed for the cure solution to act during conventional pork belly curing. Because the bacon is manufactured on a continuous production line, for example, moving continuously from the cure ingredient application station 14 to the cooking station 16, the cooking should begin shortly after the slices come out of the cure application station 14. The exact time depends on the distance between the stations and the speed at which the slices are moving. The time between stations should be less than about 10 minutes, preferably less than 1 minute, more preferably less than 15 seconds.

Therefore, adding in the cooking time, the total time from applying the cure ingredients to completing the curing and cooking process is usually less than about fifteen minutes, preferably less than ten minutes, depending on the cooking equipment and degree of cooking required. This short time between applying cure ingredients and completion of cooking eliminates the need for typical maturing of the pork belly that usually takes at least several hours. The slices, after application of the cure ingredients, return to below about 45% of the original slice green weight during the cooking process.

The cooking process at the cooking station 16 may be performed, for example, in a microwave oven that operates on a continuous basis. One particular continuous microwave processing machine found suitable for use in the present invention is manufactured by Amana Refrigeration Inc., Amana, Ia., designated as QMP 2103. The oven is powered by eight 70 kW generators which produce microwaves in the frequency of about 915 MHz.

The slices are cooked for a time period of between about 1 to about 3 minutes, preferably from about 1.5 to about 2 minutes, with a conveyor belt speed of about 450 inches per minute.

It should be understood that many conditions vary from one microwave oven to another, which make uniform cooking possible by a combination of adjustments to power level, conveyor speed, and the amount of product in the oven. Adjustment of these variables to achieve uniform cooking is deemed to be within the skill of those of ordinary skill in the art. As well, one skilled in the art may select other means to cook the pork belly slices to achieve different qualities in the cooked bacon product.

Alternatively, the sliced pork belly may be cooked on a continuous belt grill oven immediately after contacting the cure ingredients. One particular belt grill oven is manufactured by TW Kutter of Avon, Mass. and designated as Model No. B67200. This belt grill oven typically operates at a temperature of about 425° F. with the belt speed passing through the belt grill oven at about 2 sec/ft and cooking the slices between about 1.5 minutes to about 2 minutes. In this belt grill oven, the slices move in the processing direction between heat-conductive belts. The belts pass between two heat platens that at least partially cook the slices as they move between the platens.

Other suitable continuous cooking ovens, such as impingement convection ovens or deep frying ovens, may also be used.

After cooking, or at least partially cooking the bacon slices in the cooking station 16, the cooked bacon slices may be packaged, for example, by placing them on a heat proof silicon treated piece of parchment and then vacuum packed in a suitable package material.

The sliced product has the appearance, aroma, taste and texture of product processed according to the prior art curing and smoking steps.

EXAMPLE 1

Green pork bellies were pressed at 24° F. and continuously sliced at about 27° F. and to a thickness of about 2.1 mm. The stroke speed on the slicer was about 180 slices per minute. The slices dropped onto a mesh belt where they were drenched with cure from spray heads positioned above and below the belt at a distance of about 2 feet downstream from the slicer. Slices moved down the belt at a speed of about 450 inches per minute The cure at a temperature of about 38° F. was pumped to the spray heads from a tank having sufficient agitation to keep the pickle components suspended. The composition of the cure was as follows:

| Component | Percentage |
| --- | --- |
| Salt | 11.6 |
| Sugar | 7.0 |
| Liquid Smoke | 11.5 |
| Sodium Tripolyphosphate | 0.36 |
| Sodium Nitrite | 0.171 |
| Sodium Erythrobate | 0.786 |
| Water | 75.58 |

The nitrite and erythrobate concentrations in the pickle were formulated based on a 7% increase in weight from pickle by the meat so that there was 120 ppm nitrite and 550 ppm erythrobate in the raw meat prior to cooking according to USDA regulations. Following drenching with pickle, the slices were evenly coated on top with a fine powder which contained 49.6% salt, 49.7% sugar and 0.7% hickory smoke using a dry powder applicator, the purpose being to intensify the final cooked bacon flavor. The percentage of the powder in relation to drenched meat was 4.5%. Slices which entered the microwave oven with the pale appearance of raw pork were cooked to 30% of original green weight, the total time from slicing to final cooked product being 3.5 minutes. The resulting cooked bacon slices had the typical reddish lean color and cured flavor of cooked bacon slices made using the conventional curing process.

EXAMPLE 2

Green pork bellies were pressed at 24° F. and continuously sliced at about 27° F. to a thickness of about 2.1 mm. The stroke speed on the slicer was again at about 180 slices per minute and they dropped onto a moving mesh belt. The green slices were then transferred to a second mesh belt where they were sandwiched by a top hold down mesh belt and they then entered a tank which was approximately 14 inches deep by 14 inches long containing pickle which was at about 38° F. The hold down belts were configured in a serpentine pattern so that there was a one minute residence time in the pickle tank prior to exiting the tank. The slices were then transferred back to a belt which feeds the microwave oven where they were cooked. The pickle consisted of the following composition:

| Component | Percentage |
| --- | --- |
| Salt | 11.6 |
| Sugar | 7.0 |
| Liquid Smoke | 8.5 |
| Sodium Tripolyphosphate | 0.36 |
| Sodium Nitrite | 0.086 |
| Sodium Erythrobate | 0.392 |
| Water | 72.06 |

The nitrite and erythrobate concentrations in the pickle were formulated based on a 14% increase in weight from pickle by the meat so that there was 120 ppm nitrite and 550 ppm erythrobate in the raw meat prior to microwave cooking. Slices which entered the microwave oven with the pale appearance of raw pork were cooked to 30% of original green weight, the total time from slicing to final cooked product being 6 minutes. The resulting cooked bacon slices had the typical reddish lean color and cured flavor of cooked bacon slices made using the conventional curing process.

Also, it may be appreciated by one skilled in the art that the present invention may be applied to other pre-cooked bacon products, such as bacon bits or pre-arranged bacon slices. One such process for making bacon bits in a continuous process using an auger cooker is described in U.S. Pat. No. 5,637,342, the full disclosure of which is incorporated herein by reference. In that cooking unit, the pork belly would be cut into pieces that have pickle applied thereto and are moved continuously through a fryer unit by an auger or corkscrew.

Methods for making pre-arranged bacon slices are described in U.S. Pat. Nos. 4,917,911 and 5,407,693, the full disclosure of which is incorporated herein by reference. Applying those methods to this invention, the pork belly slices are assembled in an overlapping arrangement as they are sliced off of the slab. The assembled slices then move along continuous belts through a pickle application unit and then through a cooking unit for a sufficient period of time to at least partially pre-cook the slice arrangements. During cooking, the slices sear together to hold together for later use. One may appreciate that great efficiencies may be achieved in the manufacturing process by eliminating the traditional curing step and incorporating the cure ingredient application step as part of the continuous manufacturing process immediately prior to cooking the product.

As may be apparent from the above description, there are several advantages to the process of the present invention over conventional methods, the main one being the elimination of costly and time consuming traditional cure and smokehouse steps. Because of the increased surface area for slices, curing can be accomplished in minutes as opposed to hours when pickle is injected into green bellies and then placed in a smokehouse. Also, the thermal energy involved in raising injected bellies to smokehouse temperatures and returning them to green weight, followed by cooling, is eliminated. In the process of this invention, the slices return to green weight during the cooking process. This process also eliminates the needle marks which are present in conventionally cured bellies and which can result in slice breakage. Injections also may result in localized areas of concentrated pickle, which can cause areas of discoloration or a "burned" appearance in the finished, cooked product and this is eliminated when individual slices are cured. Another advantage for this invention is the flexibility to quickly vary or concentrate the cure ingredients and customize flavor, for example, without constantly changing the meat source.

Although the above description has been directed to bacon products, it will be recognized by those skilled in the art that other cured meat products, such as beef jerky and cured sausages, may also be made with the method and apparatus of the present invention.

Although the present invention has been described in connection with presently preferred embodiments, those skilled in the art will recognize many modifications to sequence, arrangement, portions, elements, materials and components which can be used in the practice of the invention without departing from its scope. The scope of the invention is defined by the following claims with reference to this specification.

We claim:

1. A method for preparing at least partially cooked bacon, the method comprising the steps of:
    providing a green pork belly;
    cutting the green pork belly into slices;
    moving the pork belly slices continuously in a processing direction;
    while the pork belly slices are moving in the processing direction, applying cure ingredients to the pork belly slices; and
    while the pork belly slices with cure ingredients applied thereto are moving in the processing direction, cooking the pork belly slices for a sufficient time to cure the pork belly slices and such that the weight of said pork belly slices is no more than about 45% of their green weight, to produce at least partially cooked, cured bacon.

2. The method of claim 1 wherein the cooking step comprises using microwave radiation.

3. The method of claim 1 wherein the cooking step comprises grilling the pork belly slices with heat.

4. The method of claim 1 wherein the cooking step comprises using a deep frying oven.

5. The method of claim 1 wherein the cooking step comprises using an impingement convection oven.

6. The method of claim 1 wherein the cure applying step comprises the step of spraying at least a portion of the cure ingredients on the slices.

7. The method of claim 1 wherein the cure applying step comprises the step of applying at least a portion of the cure ingredients in dry form.

8. The method of claim 1 wherein the cure applying step comprises immersing the pork belly slices in a cure solution.

9. The method of claim 1 wherein the cooking step is completed less than about fifteen minutes after the pork belly slices are contacted with the cure ingredients.

10. The method of claim 1 wherein the cooking step begins prior to completion of curing.

11. A continuous manufacturing method for making a bacon product that is at least partially cooked, the process comprising the steps of:
    providing a green pork belly at a temperature below about 40° F.;
    pressing the green pork belly;
    cutting the green pork belly;
    applying cure ingredients to the cut pork belly; and
    before the cut pork belly with cure ingredients applied thereto has completely cured, cooking the cut pork belly for a sufficient period of time to complete the cure of the cut pork belly and to at least partially cook the cut pork belly to the desired bacon product and produce at least partially cooked, cured bacon product.

12. The method of claim 11 wherein the bacon product is pre-cooked sliced bacon.

13. The method of claim 11 wherein the bacon product is fully cooked sliced bacon.

14. The method of claim 12 further comprising assembling the cut pork belly into an overlapping slice arrangement prior to cooking.

15. The method of claim 11 wherein the cut pork belly begins cooking less than about 120 seconds after the cure ingredients are applied.

16. The method of claim 11 wherein the cure ingredients are applied and the cut pork belly is cooked in a continuous manufacturing process line without an intervening process step.

17. The method of claim 11 wherein the cure ingredients are applied as a liquid cure for a sufficient time such that the cut pork belly absorbs between about 6% and 20% of its weight in cure solution.

18. The method of claim 11 wherein the cure ingredients are applied as a dry cure for a sufficient time such that the cut pork belly absorbs between about 1% and 7% of its weight in dry cure ingredients.

19. The method of claim 11 wherein the cooking is performed by continuously moving the cut pork belly through a microwave oven.

20. The method of claim 11 wherein the cooking is performed by continuously moving the cut pork belly through a belt grill oven.

21. The method of claim 11 wherein the cooking is performed by continuously moving the cut pork belly through an impingement convection oven.

22. The method of claim 11 wherein the cooking is performed by continuously moving the cut pork belly through a deep frying oven.

23. A method of preparing at least partially cooked bacon slices, the method comprising the steps of:

slicing a green pork belly that has not been subjected to a curing or smokehouse process;

placing pork belly slices onto a moving belt;

applying cure ingredients to the pork belly slices; and cooking the pork belly slices for a sufficient period of time to cure the pork belly slices and to reduce the weight of the pork belly slices to less than about 45% of their green weight, wherein the cooking is started in less than about ten minutes after the cure ingredients have been applied to produce at least partially cooked, cured bacon slices.

24. The method of claim 23 wherein the cure ingredients approximates the following composition:

| | |
|---|---|
| salt | 11.6%; |
| sugar | 7.0%; |
| smoke flavoring | 8.5%; |
| sodium erythrobate | 0.392%; |
| sodium nitrite | 0.086%; |
| sodium phosphate | 0.36%; |
| water | 72.06%; |

25. The method of claim 23 wherein the cooking time is less than about 15 minutes.

26. The method of claim 23 wherein the cooking is performed by continuously moving the pork belly slices through a continuous cooking station.

27. The method of claim 26 wherein the cooking is performed by continuously moving the pork belly slices through a microwave oven.

28. The method of claim 26 wherein the cooking is performed by continuously moving the pork belly slices through a belt grill oven.

29. The method of claim 26 wherein the cooking is performed by continuously moving the pork belly slices through an impingement convection oven.

30. The method of claim 26 wherein the cooking is performed by continuously moving the pork belly slices through a deep frying oven.

31. The method of claim 23 wherein the cure ingredients comprise cure ingredients in a liquid cure solution which is applied by a process selected from spraying the cure solution onto the pork belly slices and immersing the pork belly slices into the cure solution.

32. The method of claim 23 wherein the cure ingredients comprise dry cure ingredients which are applied by using a dry powder applicator.

33. An apparatus for continuously preparing at least partially cooked bacon, the apparatus comprising:

a pork belly slicing device;

a cure application station and at least one continuous belt for moving pork belly slices from the slicing device, to and through the cure application station; and a continuous cooking station including a continuous cooking oven and at least one continuous belt for moving the pork belly slices from the cure application station, to and through the continuous cooking oven.

34. The apparatus of claim 33 wherein the cure application station comprises a liquid cure solution application unit.

35. The apparatus of claim 34 wherein the liquid cure application unit includes at least one spray head for spraying liquid cure solution to the pork belly slices as they move past the at least one spray head.

36. The apparatus of claim 34 wherein the liquid cure solution application unit includes an immersion tank and a continuously moving belt for conveying the pork belly slices through the liquid cure solution in the immersion tank.

37. The apparatus of claim 34 further comprising a dry cure application unit which includes a dry powder applicator for dispersing dry cure ingredients to the pork belly slices as they move past the applicator.

38. The apparatus of claim 33 wherein the continuous cooking oven comprises a microwave oven.

39. The apparatus of claim 33 wherein the continuous cooking oven comprises a belt grill oven.

40. The apparatus of claim 33 wherein the continuous cooking oven comprises an impingement convection oven.

41. The apparatus of claim 33 wherein the continuous cooking oven comprises a deep frying oven.

42. The apparatus of claim 33 where in the cure application station comprises a dry powder application unit for dispersing dry cure ingredients to the pork belly slices.

* * * * *